(12) United States Patent
Kumano et al.

(10) Patent No.: US 9,563,651 B2
(45) Date of Patent: Feb. 7, 2017

(54) STORAGE CONTROL DEVICE AND STORAGE CONTROL METHOD

(71) Applicant: FUJITSU LIMITED, Kawasaki-shi, Kanagawa (JP)

(72) Inventors: Tatsuo Kumano, Kawasaki (JP); Ken Iizawa, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 280 days.

(21) Appl. No.: 14/256,541

(22) Filed: Apr. 18, 2014

(65) Prior Publication Data

US 2014/0351294 A1  Nov. 27, 2014

(30) Foreign Application Priority Data

May 27, 2013 (JP) .................. 2013-110640

(51) Int. Cl.
*G06F 17/30* (2006.01)
(52) U.S. Cl.
CPC ... *G06F 17/30312* (2013.01); *G06F 17/30321* (2013.01)
(58) Field of Classification Search
CPC ............. G06F 17/30321; G06F 17/30312
USPC .................................. 707/741, 812
See application file for complete search history.

(56) References Cited

U.S. PATENT DOCUMENTS

| | | | |
|---|---|---|---|
| 7,099,879 B2 * | 8/2006 | Tacaille ................ | H04L 41/145 707/737 |
| 7,523,286 B2 * | 4/2009 | Ramany ................ | G06F 3/0605 710/240 |
| 2002/0103969 A1 | 8/2002 | Koizumi et al. | |
| 2003/0120666 A1 * | 6/2003 | Tacaille ................ | H04L 41/145 707/999.1 |
| 2003/0188085 A1 | 10/2003 | Arakawa et al. | |
| 2005/0080810 A1 * | 4/2005 | Matsuura ............... | G06F 3/0605 707/E17.01 |
| 2006/0015773 A1 * | 1/2006 | Singh ................... | G06F 11/2046 714/13 |
| 2006/0112247 A1 * | 5/2006 | Ramany ................ | G06F 3/0605 711/165 |

FOREIGN PATENT DOCUMENTS

| | | |
|---|---|---|
| JP | 11-25059 | 1/1999 |
| JP | 2000-215007 | 8/2000 |
| JP | 2002-182859 | 6/2002 |
| JP | 2003-296039 | 10/2003 |

* cited by examiner

*Primary Examiner* — Phong Nguyen
(74) *Attorney, Agent, or Firm* — Staas & Halsey LLP

(57) ABSTRACT

A first processor is configured to acquire measurement values of plural types of processing index values each indicating a state of processing loads on a storage control device, and plural types of access index values each indicating a state of loads of an access process performed for each of plural pieces of data stored in a first storage device. The first processor is configured to select a first access index value corresponding to a first processing index value when the acquired measurement value of the first processing index value exceeds a threshold value. The first processor is configured to move a first piece of data from the first storage device to a second storage device. The acquired measurement value of the first access index value for the first piece of data is higher than the acquired measurement value of the first access index value for any other piece of data.

13 Claims, 12 Drawing Sheets

| SERVER | PROCESSOR USAGE RATE | DISK BUSY RATE | NETWORK TRANSFER VOLUME | CACHE USAGE AMOUNT |
|---|---|---|---|---|
| SERVER#A | 90% | 10% | 3GB | 80MB |

| SLOT | PROCESSING TIME | NETWORK TRANSFER VOLUME | CACHE USAGE AMOUNT |
|------|-----------------|--------------------------|---------------------|
| SLOT#1 | 55 SECONDS | 10MB | 1MB |
| SLOT#2 | 1 SECOND | 1MB | 1MB |
| SLOT#3 | 1 SECOND | 1MB | 0.1MB |
| ... | ... | ... | ... |

| SLOT | PLACEMENT SERVER | STATE |
|---|---|---|
| SLOT#1 | SERVER#A | NORMAL |
| SLOT#2 | SERVER#A | MOVING |
| SLOT#3 | SERVER#B | NORMAL |
| ⋮ | ⋮ | ⋮ |
| SLOT#9 | SERVER#C | NORMAL |

STORAGE CONTROL DEVICE AND STORAGE CONTROL METHOD

CROSS-REFERENCE TO RELATED APPLICATION

This application is based upon and claims the benefit of priority of the prior Japanese Patent Application No. 2013-110640, filed on May 27, 2013, the entire contents of which are incorporated herein by reference.

FIELD

The embodiments discussed herein are related to a storage control device and a storage control method.

BACKGROUND

A distributed storage system is actualized by causing a plurality of storage devices and storage control devices that control data access to the plurality of storage devices to be grouped into clusters. The distributed storage system has high system expandability in case of increase in the volume of data to be stored.

Various techniques have been proposed to improve performance of the storage system. For example, a technique is proposed in which resource usage information including a plurality of pieces of information, such as a processor usage rate, is tabulated for a total or for each logical volume number. When any of the tabulated results exceeds a threshold value, a warning is issued.

In addition, for example, a technique has been proposed in which a load factor of a central processing unit (CPU) of a server is monitored based on previous tendencies at all times. Overloaded servers and low-load servers are extracted. For overloaded servers, the content name of a content to which users are concentrated is hidden from a menu list. For low-load servers, the content name and the content are copied from the overloaded server.

Related techniques are disclosed in, for example, Japanese Laid-open Patent Publication No. 2003-296039 and Japanese Laid-open Patent Publication No. 11-25059.

In the distributed storage system, in order to move data between storage devices for the purpose of distributing processing load placed on storage control devices, the data to be moved has to be appropriately selected. However, it is difficult to accurately determine which piece of data, among the plurality of pieces of data stored in the storage devices, is most affecting the load placed on the storage control device. Therefore, a problem occurs in that appropriate selection of data effective for reducing the load placed on the storage control device is difficult.

SUMMARY

According to an aspect of the present invention, provided is a storage control device that controls access to a first storage device of a plurality of storage devices. The storage control device includes a first processor. The first processor is configured to acquire measurement values of plural types of processing index values each indicating a state of processing loads on the storage control device, and plural types of access index values each indicating a state of loads of an access process performed for each of plural pieces of data stored in the first storage device. The first processor is configured to select a first access index value corresponding to a first processing index value when the acquired measurement value of the first processing index value exceeds a threshold value set for the first processing index value. The first processing index value is one of the plural types of processing index values. The first access index value is one of the plural types of access index values. The first processor is configured to move a first piece of data from the first storage device to a second storage device of the plurality of storage devices. Access to the second storage device is controlled by a first control device different from the storage control device. The acquired measurement value of the first access index value for the first piece of data is higher than the acquired measurement value of the first access index value for any other piece of data stored in the first storage device.

The objects and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of a server load information table;

FIG. 6 is a diagram illustrating an example of a slot load information table;

FIG. 9 is a diagram illustrating an example of a slot placement table;

DESCRIPTION OF EMBODIMENTS

Hereinafter, embodiments of the present disclosure are described with reference to the drawings.

First Embodiment

Figure 1:
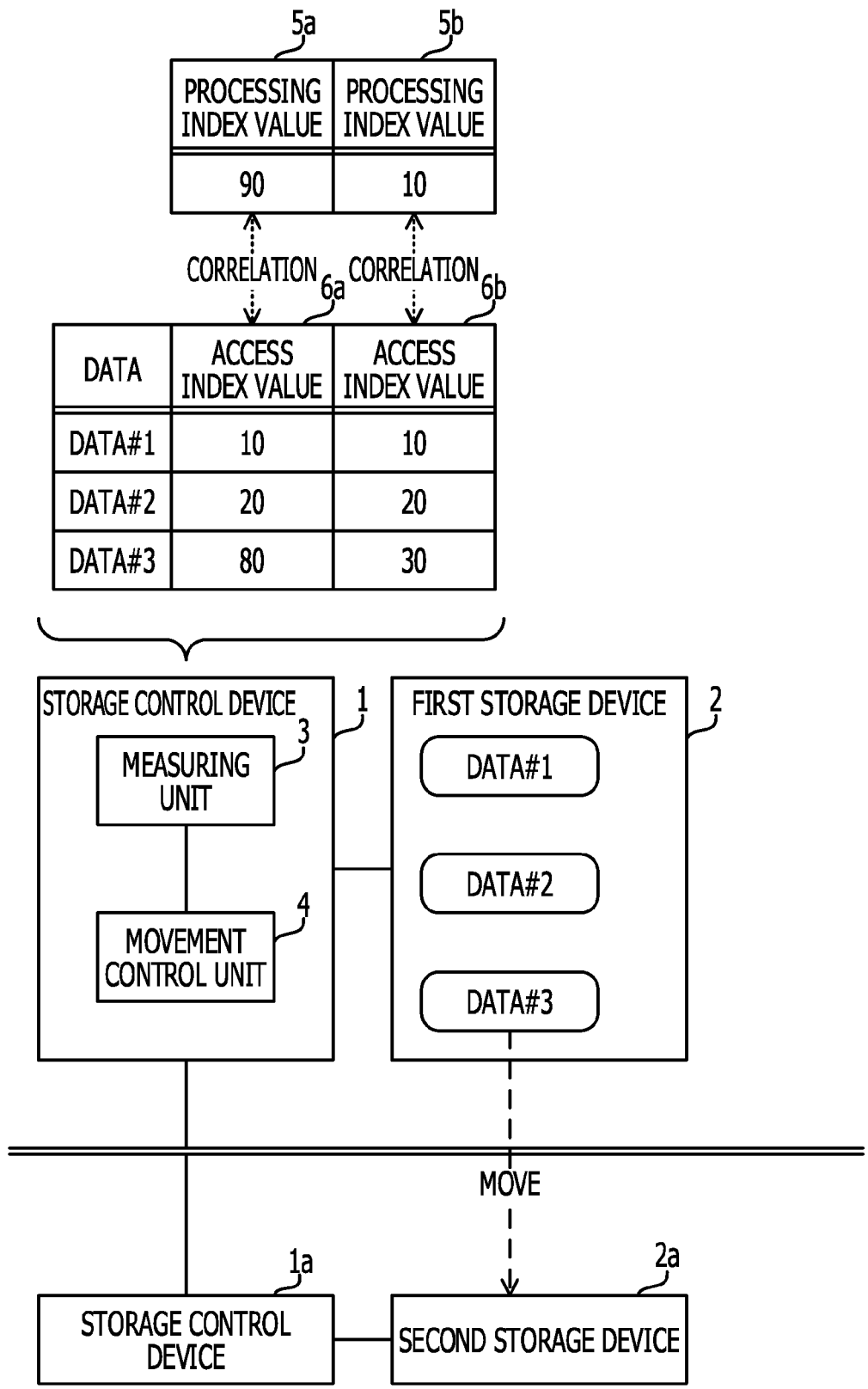
FIG. 1 is a diagram illustrating an exemplary configuration and an exemplary processing of a storage control device according to a first embodiment.

FIG. 1 is a diagram illustrating an exemplary configuration and an exemplary processing of a storage control device according to a first embodiment. A storage control device 1 controls access to a storage device 2 (first storage device). The storage control device 1 has a measuring unit 3 and a movement control unit 4.

The measuring unit 3 measures plural types of processing index values, each indicating a state of processing loads on the storage control device 1, and plural types of access index values, each indicating a state of loads of an access process performed for each of a plurality of pieces of data stored in the storage device 2.

When any of the plural types of processing index values exceeds a threshold value set for each processing index value, the movement control unit 4 selects an access index value, among the plural types of access index values, which corresponds to the processing index value that has exceeded the threshold value. The movement control unit 4 then moves a piece of data of which the selected access index value is the highest from the storage device 2 to another storage device (second storage device).

The destination of the piece of data moved by the movement control unit 4 is a storage device of which access thereto is controlled by a device other than the storage control device 1. For example, FIG. 1 illustrates a storage control device 1a and a storage device 2a of which access thereto is controlled by the storage control device 1a. In the example, data stored in the storage device 2 is moved to the storage device 2a. The storage control device is may have processing functions similar to those of the storage control device 1, in other words, may have the processing functions of the measuring unit 3 and the movement control unit 4.

Here, as illustrated in FIG. 1, an example is described in which pieces of data (DATA#1, DATA#2, and DATA#3) are stored in the storage device 2, and any of these pieces of data is moved to the storage device 2a.

In addition, as illustrated in FIG. 1, the measuring unit 3 measures two types of processing index values 5a and 5b, and two types of access index values 6a and 6b. It is assumed that the processing index value 5a and the access index value 6a correlate with each other and that the processing index value 5b and the access index value 6b correlate with each other.

Threshold values of the processing index values 5a and 5b are respectively "80". It is assumed that a measurement value of the processing index value 5a measured by the measuring unit 3 exceeds the threshold value "80" and reaches "90". Then, the movement control unit 4 selects the access index value 6a corresponding to the processing index value 5a. Here, the measurement value of the access index value 6a of DATA#1 measured by the measuring unit 3 is "10", the measurement value of the access index value 6a of DATA#2 is "20", and the measurement value of the access index value 6a of DATA#3 is "80". Therefore, the movement control unit 4 moves DATA#3 of which the selected access index value 6a is the highest to the storage device 2a.

As described above, when the measurement value of the processing index value 5a exceeds the threshold value, a piece of data of which the measurement value of the access index value 6a corresponding to the processing index value 5a is the highest is selected. The selected piece of data is then moved to the other storage device 2a.

Here, each of the plural types of processing index values is associated in advance with an access index value with which correlation is high. A high correlation between the processing index value and the access index value indicates an assumption that the possibility is high that, when an access index value of a certain piece of data increases, a factor causing the access index value to increase is also a factor that causes the corresponding processing index value to increase.

In the example in FIG. 1, the access index value 6a that is highly correlated with the processing index value 5a is selected. The piece of data to be moved is selected based on the selected access index value 6a. As a result, after the piece of data is moved, the measurement value of the processing index value 5a may be decreased with certainty, and the extent of decrease may be increased. Therefore, the piece of data to be moved to reduce load placed on the storage control device 1 may be appropriately selected. Thus, load distribution between the storage control device 1 and the storage control device is may be optimized.

The processing index value and the access index value do not have to be associated, one to one. For example, a single type of access index value may be associated with plural types of processing index values. Alternatively, plural types of access index values may be associated with a single type of processing index value.

In the above-described example, the processing index values and the access index values are measured for each piece of data stored in the storage device 2. However, as another example, the processing index values and the access index values may be measured for each predetermined data group. In this case, when any of the processing index values exceeds a predetermined threshold value, the movement control unit 4 selects an access index value, among the plural types of access index values, that corresponds to the processing index value that has exceeded the threshold value and moves a data group of which the selected access index value is the highest from the storage device 2 to another storage device.

Second Embodiment

Next, an example is described in which the storage control devices 1 and 1a illustrated in FIG. 1 are applied to an object storage system.

Figure 2:
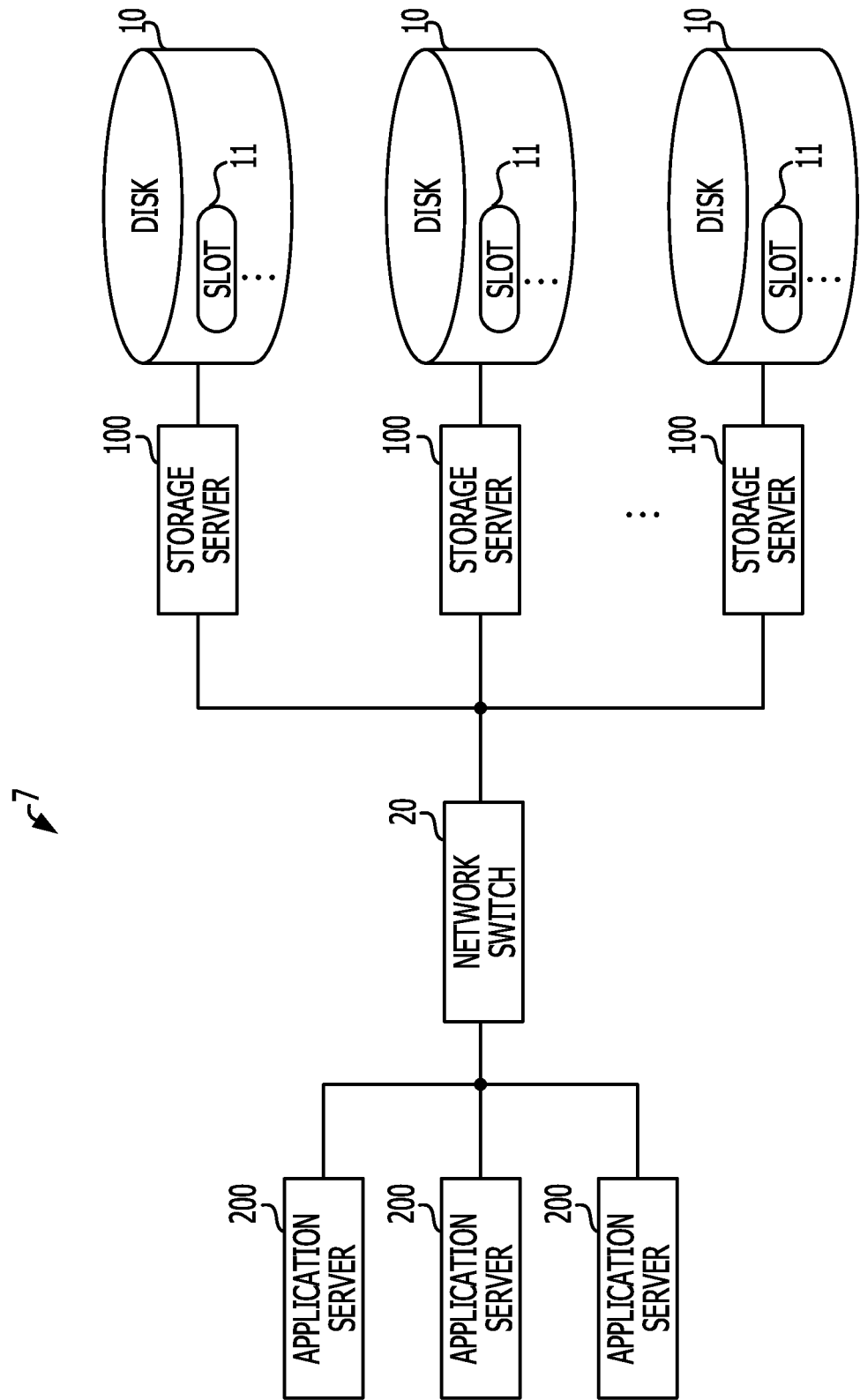
FIG. 2 is a diagram illustrating an example of an object storage system according to a second embodiment.

FIG. 2 is a diagram illustrating an example of an object storage system according to a second embodiment. In an object storage system 7, data is processed as an "object". Objects are distributed among a plurality of storage nodes and placed therein in units of "slots". Each slot is composed of a group of plural objects.

The object storage system 7 includes a plurality of disks 10, a network switch 20, a plurality of application servers 200, and a plurality of storage servers 100. Each application server 200 is connected to the storage servers 100 via the network switch 20. Each storage server 100 is connected to a corresponding disk 10.

A single storage server 100 and the disk 10 connected to the storage server 100 correspond to a single storage node. The disk 10 has a storage area in which objects are stored in units of slots 11 in the storage node. The disk 10 is actualized by one or more storage devices. A hard disk drive (HDD), a solid state drive (SDD), or the like is used as the storage device.

The storage server 100 is a server device that controls access to the objects stored in the corresponding disk 10. When an access request is received from an application server 200, the storage server 100 accesses the requested object. The storage server 100 has a function of increasing the speed of access to the object using a cache memory.

The storage server 100 measures server load information related to load placed on the storage server 100 itself, and slot load information related to load on each slot stored in the disk 10 corresponding to the storage server 100 itself. The storage server 100 selects a slot 11 from the corresponding disk 10 based on the measurement values, moves the selected slot 11 to a disk 10 corresponding to another storage server 100, thereby distributing load among the storage servers 100.

The application server 200 is a server device that provides users with a service. During a process for providing users with a service, the application server 200 issues a request for writing or reading an object to any of the storage servers 100. For example, the application server 200 requests writing or reading an object in response to a request from a terminal device that is operated by a user.

When accessing an object, the application server 200 identifies a slot 11 that includes the object to be accessed, and determines a storage server 100 that corresponds to the identified slot 11. For example, each application server 200 holds table information that indicates correlations regarding which slot 11 corresponds to which storage server 100. The application server 200 determines the storage server 100 that corresponds to the identified slot 11 based on the table information. The application server 200 transmits an access request for the object to the determined storage server 100.

Figure 3:
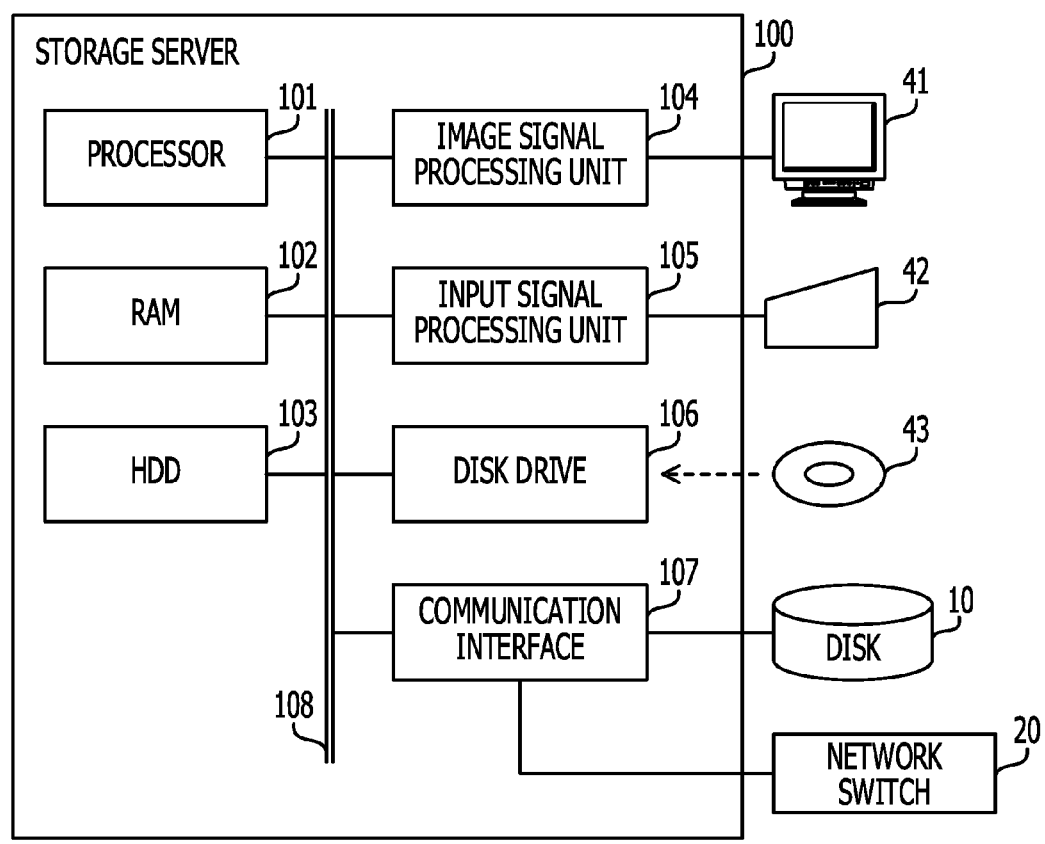
FIG. 3 is a diagram illustrating an exemplary hardware configuration of a storage server.

FIG. 3 is a diagram illustrating an exemplary hardware configuration of a storage server. The storage server 100 includes a processor 101, a random access memory (RAM) 102, an HDD 103, an image signal processing unit 104, an input signal processing unit 105, a disk drive 106, and a communication interface 107. These units are connected by a bus 108 within the storage server 100.

The processor 101 includes a computing unit that executes commands in a program. The processor 101 loads at least some pieces of a program and data stored in the HDD 103 into the RAM 102, and executes the program. The processor 101 may include a plurality of processor cores. The storage server 100 may include a plurality of processors. In addition, the storage server 100 may perform parallel processing using a plurality of processors or a plurality of processor cores. Furthermore, an assembly of two or more processors, a dedicated circuit such as a field programmable gate array (FPGA) or an application specific integrated circuit (ASIC), an assembly of two or more dedicated circuits, a combination of a processor and a dedicated circuit, or the like may be referred to as a "processor".

The RAM 102 is a volatile memory that temporarily stores therein a program to be executed by the processor 101 and data to be referenced by the processor 101 during the execution of the program. The storage server 100 may include a memory of a type other than the RAM. The storage server 100 may include a plurality of volatile memories.

The HDD 103 is a non-volatile storage device that stores therein data and software programs such as an operating system (OS), firmware, and application software. The storage server 100 may include another type of storage device such as a flash memory. The storage server 100 may include a plurality of non-volatile memories.

The image signal processing unit 104 outputs an image to a display 41 that is connected to the storage server 100, in accordance with a command issued by the processor 101. A cathode ray tube (CRT) display, a liquid crystal display, or the like may be used as the display 41.

The input signal processing unit 105 acquires an input signal from an input device 42 that is connected to the storage server 100 and notifies the processor 101 of the input signal. A pointing device such as a mouse or a touch panel, a keyboard, or the like may be used as the input device 42.

The disk drive 106 is a drive unit that reads programs and data recorded on a recording medium 43. For example, a magnetic disk such as a flexible disk (FD) or an HDD, an optical disk such as a compact disc (CD) or a digital versatile disc (DVD), or a magneto-optical disk (MO) may be used as the recording medium 43. The disk drive 106 stores the programs and data read from the recording medium 43 into the RAM 102 or the HDD 103, in accordance with a command issued by the processor 101.

The communication interface 107 performs communication with another information processing unit such as the disk 10, over a network such as the network switch 20.

The storage server 100 may not include the disk drive 106. When the storage server 100 is accessed exclusively by another information processing unit, the image signal processing unit 104 and the input signal processing unit 105 may not be included. The display 41 and the input device 42 may be formed integrally with a housing of the storage server 100.

The application server 200 may be actualized using hardware similar to that of the storage server 100.

Figure 4:
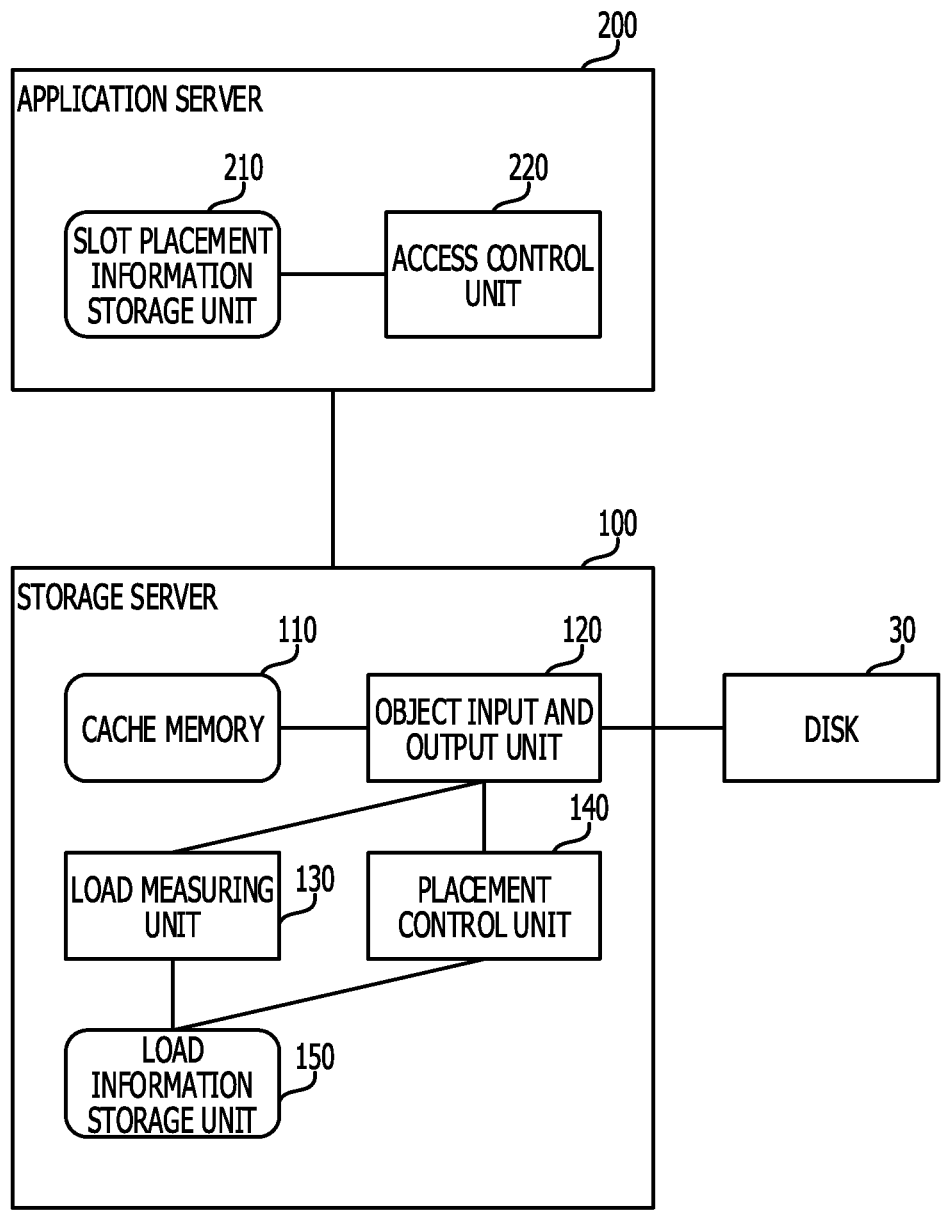
FIG. 4 is a diagram illustrating an exemplary functional configuration of a storage server.

FIG. 4 is a diagram illustrating an exemplary functional configuration of a storage server. The application server 200 includes a slot placement information storage unit 210 and an access control unit 220.

The slot placement information storage unit 210 stores therein a slot placement table that stores information related to the placement of each slot 11. For example, the information related to placement may include a placement destination or a placement state of each slot 11. The information related to the placement of each slot 11 is shared among the application servers 200.

The access control unit 220 issues a request for access to an object to the storage server 100 in the following manner. First, the access control unit 220 identifies a slot 11 that includes the object to be accessed. Next, the access control unit 220 identifies a storage server 100 that corresponds to the identified slot 11 with reference to the slot placement table. Then, the access control unit 220 transmits the access request for the object to the identified storage server 100.

When slot relocation is performed, the access control unit 220 updates the slot placement table in response to a request from the storage server 100.

The storage server 100 includes a cache memory 110, an object input and output (I/O) unit 120, a load measuring unit 130, a placement control unit 140, and a load information storage unit 150.

The cache memory 110 temporarily stores therein data for allowing the object I/O unit 120 to access an object.

The load information storage unit 150 stores therein a server load information table that stores server load information related to load placed on the storage server 100. The server load information is measurement values for estimating the overall load placed on the storage server 100. The server load information may hereafter be referred to as "server load values". The server load information table includes plural types of server load values, such as a processor usage rate and a network transfer volume. The server load information table is updated every time the load measuring unit 130 measures the server load values.

The load information storage unit 150 stores therein a slot load information table that stores slot load information related to load placed on each slot 11. The slot load information is measurement values for estimating, for each slot, the effect that an access process performed on the slot has on the overall load of the storage server 100. The slot load information may hereafter be referred to as "slot load values". The slot load information table includes plural types of slot load values, such as a processing time for accessing an object in the slot and a network transfer volume. Each type of slot load values correlates with at least one type of server load values.

The object I/O unit 120, the load measuring unit 130, and the placement control unit 140 are, for example, actualized by the processor 101 included in the storage server 100 by executing a predetermined program.

When an access request is received from the application server 200, the object I/O unit 120 accesses the object designated by the application server 200. In addition, the object I/O unit 120 transmits a designated slot 11 to a designated other storage server 100 in response to a request from the placement control unit 140.

The object I/O unit 120 performs cache control of objects using the cache memory 110. For example, the object I/O unit 120 stores the object of which writing and reading is requested by the application server 200 to the cache memory 110, in addition to storing the object in a disk 30. Then, the object I/O unit 120 subsequently accesses the object through the cache memory 110. When a request for access to an object stored in the cache memory 110 is not issued for a certain period of time or more, the object I/O unit 120 deletes the object from the cache memory 110.

The load measuring unit 130 measures the server load values of the storage server 100 which includes the load measuring unit 130, and the slot load values. The load measuring unit 130 stores the information related to measured load in the server load information table and the slot load information table.

Processes performed by the load measuring unit 130 are actualized by executing a predetermined application program. Some of the measurement processes performed by the load measuring unit 130 may be actualized by executing an OS program. For example, when the processes performed by the object I/O unit 120 are actualized by executing an OS program, some of the above-described measurement processes may be performed by the object I/O unit 120. In this case, the load measuring unit 130 acquires the measurement values measured by the object I/O unit 120 by using an application program interface (API) of the OS.

The placement control unit 140 references the server load information table and determines whether or not any of the server load values of the storage server 100 which includes the placement control unit 140 is a threshold value or higher. When determined that any of the server load values of the storage server 100 which includes the placement control unit 140 is the threshold value or higher, the placement control unit 140 moves a slot 11 that is affecting the server load value of the storage server 100 to another storage server 100 in the following manner.

First, the placement control unit 140 selects the type of slot load value that corresponds to the type of the server load value that is the threshold value or higher. The type of the corresponding slot load value is the type of load value that has a high correlation with the type of the server load value. The placement control unit 140 extracts a slot 11 of which the slot load value of the selected type is the highest from the disk 10 connected to the storage server 100.

The placement control unit 140 acquires, from each of the other storage servers 100, the server load value of the same type as the server load value that has reached the threshold value or higher. The placement control unit 140 then identifies a storage server 100 of which the acquired server load value is the lowest.

The placement control unit 140 issues a request to the object I/O unit 120 to place the extracted slot 11 in the identified storage server 100. At this time, the placement control unit 140 updates the slot placement table held in each application server 200.

Next, the tables used by the object storage system 7 are described with reference to FIGS. 5 to 7 and 9. Furthermore, a method for measuring a slot processing time, which is a field in the table in FIG. 6, is described with reference to FIG. 8.

FIG. 5 is a diagram illustrating an example of the server load information table. A server load information table 151 stores therein the measurement values of the server load values of the storage server 100 that includes the server load information table 151. The server load information table 151 is stored in the load information storage unit 150.

The server load information table 151 has a server field, a processor usage rate field, a disk busy rate field, a network transfer volume field, and a cache usage amount field.

An identifier for identifying a storage server 100 is set in the server field.

Information (hereinafter, referred to as a processor usage rate) indicating the percentage of time, within a most recent unit time, during which the processor performs a predetermined process of the OS or an application software is set in the processor usage rate field. The predetermined process described here includes at least a process for accessing an object in response to a request from the application server 200.

Information (hereinafter, referred to as a disk busy rate) indicating the percentage of disk access time, within the most recent unit time, of access to the disk 10 by the storage server 100 is set in the disk busy rate field. For example, the disk busy rate indicates the percentage of time, within the most recent unit time, during which data transfer at a certain transfer rate or higher is performed between the object I/O unit 120 and the disk 30.

Information (hereinafter, referred to as a network transfer volume) indicating the size of data transmitted or received between the storage server 100 and the network during the most recent unit time is set in the network transfer volume field. The network transfer volume may indicate, for example, the data size of any transmission to the network or reception from the network. Alternatively, the network transfer volume may indicate a total or average data size of transmissions and receptions to and from the network.

Information (hereinafter, referred to as a cache usage amount) indicating the current usage amount of the cache memory 110 is set in the cache usage amount field.

The measurement values of the server load values in the server load information table 151 are updated, for example, at a certain interval.

In addition, for example, the server load values measured in other storage servers 100 may be periodically collected and stored in the server load information table 151.

FIG. 6 is a diagram illustrating an example of a slot load information table. A slot load information table 152 stores therein the measurement values of the slot load values for each slot. The slot load information table 152 is stored in the load information storage unit 150.

The slot load information table 152 has a slot field, a processing time field, a network transfer volume field, and a cache usage amount field.

An identifier for identifying a slot 11 managed by the storage server 100 is set in the slot field.

The total amount (hereinafter, referred to as a processing time) of time for an access process performed by the storage server 100 on a corresponding slot during the most recent access process performed on the slot 11 is set in the processing time field. Specifically, the amount of time for the access process is the amount of time from the time at which the storage server 100 receives the access request for the data included in the slot 11 to the time at which the storage server 100 completes the response to the access request.

A total value or an average value of the processing time of each access process for an object in the slot 11 during the most recent unit time may be set in the processing time field.

A case in which access processes are performed concurrently on a plurality of slots 11 is described with reference to FIG. 8.

Information (hereinafter, referred to as a network transfer volume) indicating the total size of data transmitted and received by the storage server 100 when accessing the slot 11 during the most recent unit time is set in the network transfer volume field.

Information (hereinafter, referred to as a cache usage amount) indicating the current usage amount of the cache memory 110 being used to access an object included in the slot 11 is set in the cache usage amount field.

A record for each slot in the slot load information table 152 is updated, for example, each time an object included in the slot is accessed.

A network transfer rate may be used instead of the above-described network transfer volume as the types of server load values and slot load values.

Figure 7:
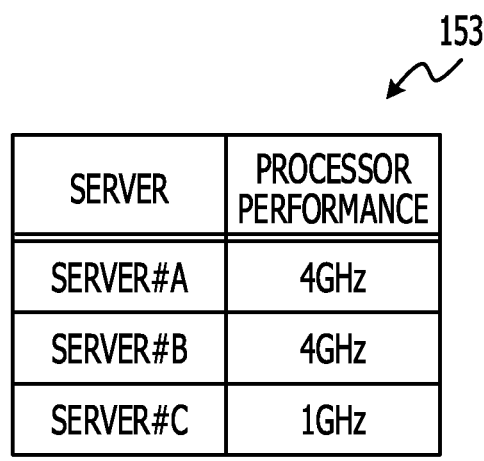
FIG. 7 is a diagram illustrating an example of a processor performance table.

FIG. 7 is a diagram illustrating an example of a processor performance table. A processor performance table 153 stores information indicating performance of the processor in each storage server 100. The processor performance table 153 is stored in the load information storage unit 150.

The processor performance table 153 has a server field and a processor performance field. An identifier for identifying a storage server 100 is set in the server field. Information indicating performance of the processor in the storage server 100 is set in the processor performance field. In the object storage system 7, the performance of the processor is the clock count per predetermined unit time of the processor 101.

For example, information in the processor performance table 153 is stored in each storage server 100 in advance by an input operation by an administrator.

Figure 8:
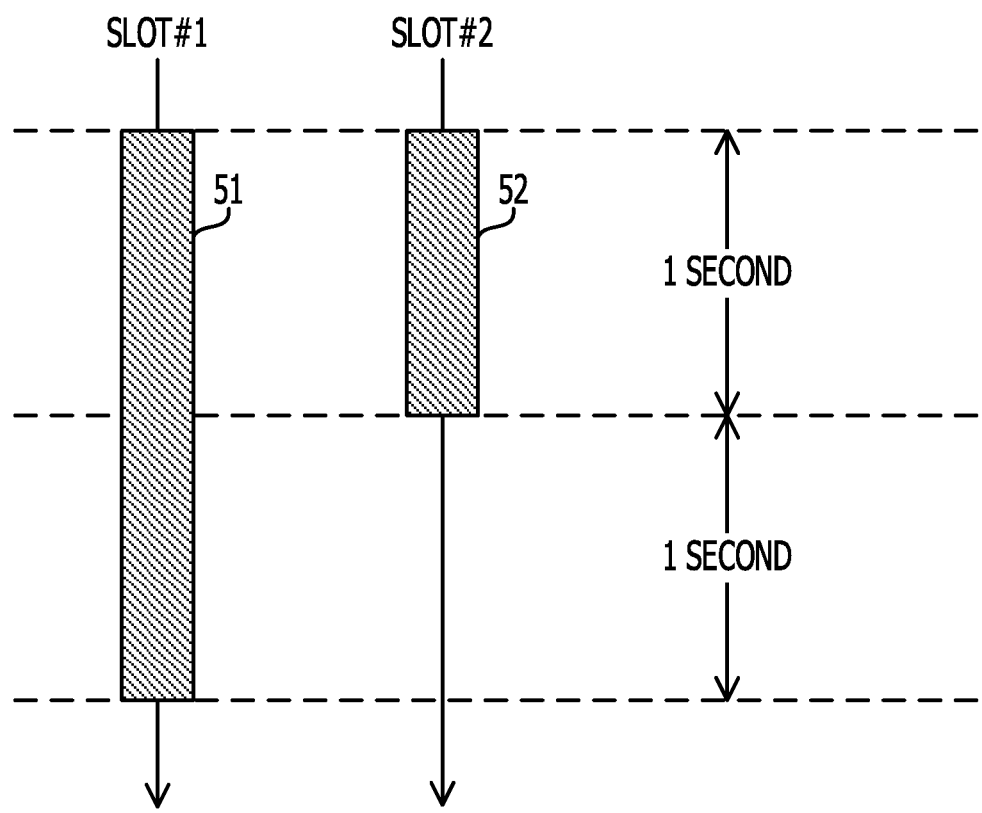
FIG. 8 is a diagram illustrating an exemplary measurement for processing time of slots.

FIG. 8 is a diagram illustrating an exemplary measurement of the processing time of a slot. The storage server 100 may concurrently perform access processes on a plurality of slots 11. The following methods are given as a method for measuring the processing times of the slots 11 in this case.

(1) Measurement of the processing time of the access processes is performed in a manner similar to when the access processes are not concurrently performed.

(2) The time over which the access processes are concurrently performed is divided by the number of slots 11 on which the access processes are performed.

In FIG. 8, it is assumed that access processes on slots slot#1 and slot#2 are concurrently performed. A period 51 in FIG. 8 indicates a period from when an access request for an object included in slot#1 is received to when a response of access completion is made. In a similar manner, a period 52 indicates a period from when an access request for an object included in slot#2 is received to when a response of access completion is made.

For example, the access process on slot#2 is performed for one second. The access process on slot#1 is performed for two seconds. Of the two seconds, the access processes on slot#1 and slot#2 are performed concurrently during the first second.

In this case, in the above-described measurement method (1), the processing time of slot#1 is two seconds. The processing time of slot#2 is 1 second. Meanwhile, in the above-described measurement method (2), the processing time of slot#1 is "1 [second]/2+1 [second]=1.5 [seconds]". The processing time of slot#2 is "1 [second]/2=0.5 [seconds]".

In this way, the measurement value of the processing time of the slot 11 differs depending on the measurement method.

In the above-described measurement method (2), the extent of the effect on resources, such as the processor 101, is able to be derived with high accuracy for each slot 11. Either measurement method may be used in the object storage system 7.

FIG. 9 is a diagram illustrating an example of the slot placement table. A slot placement table 211 stores therein information related to the placement of each slot 11. The slot placement table 211 is stored in the slot placement information storage unit 210. The slot placement table 211 is shared among the application servers 200.

The slot placement table 211 has a slot field, a placement server field, and a state field.

An identifier for identifying a slot 11 managed by the object storage system 7 is set in the slot field.

An identifier for identifying a storage server 100 that corresponds to the disk 10 in which the slot 11 is placed is set in the placement server field. The access control unit 220 of the application server 200 may identify the storage server 100 to be the destination of an access request from the information set in the placement server field.

Information indicating the state of the slot 11 is set in the state field. For example, when the placement control unit 140 is performing a moving process on the slot 11, "moving" is set in the state field. When the placement control unit 140 is not performing a moving process on the slot 11, "normal" is set in the state field.

When the application server 200 requests access to a slot 11, the state field is used to determine whether or not the slot 11 is able to be accessed. Specifically, the application server 200 determines the state of the slot 11 before accessing the slot 11. When the state of the slot 11 is "moving", for example, the application server 200 delays the access request to the slot 11 until the state of the slot becomes "normal". When the state of the slot 11 is "normal", the application server 200 issues the access request to the slot 11.

When requesting access to an object, the access control unit 220 of the application server 200 may unambiguously identify the slot including the object from information related to the object (such as an object name, object path information, object data, and the like). The object and the slot are associated, for example, in the following manner.

For example, in a case in which objects are distributed and placed using consistent hashing, the objects are distributed among slots based on hash values of information related to the objects. For example, the magnitude of the hash value is divided into a plurality of ranges using threshold values. Objects of which the hash values belong to the same range are associated with the same slot.

As another example, the magnitude of a character code value of information related to an object is divided into a plurality of ranges using threshold values. Objects of which the character code values belong to the same range may be associated with the same slot.

As yet another example, a single object may be associated with a single slot. In this case, relocation of data may be performed in object units.

Next, relocation of the slot 11 is described with reference to the flowcharts in FIGS. 10 and 11.

Figure 10:
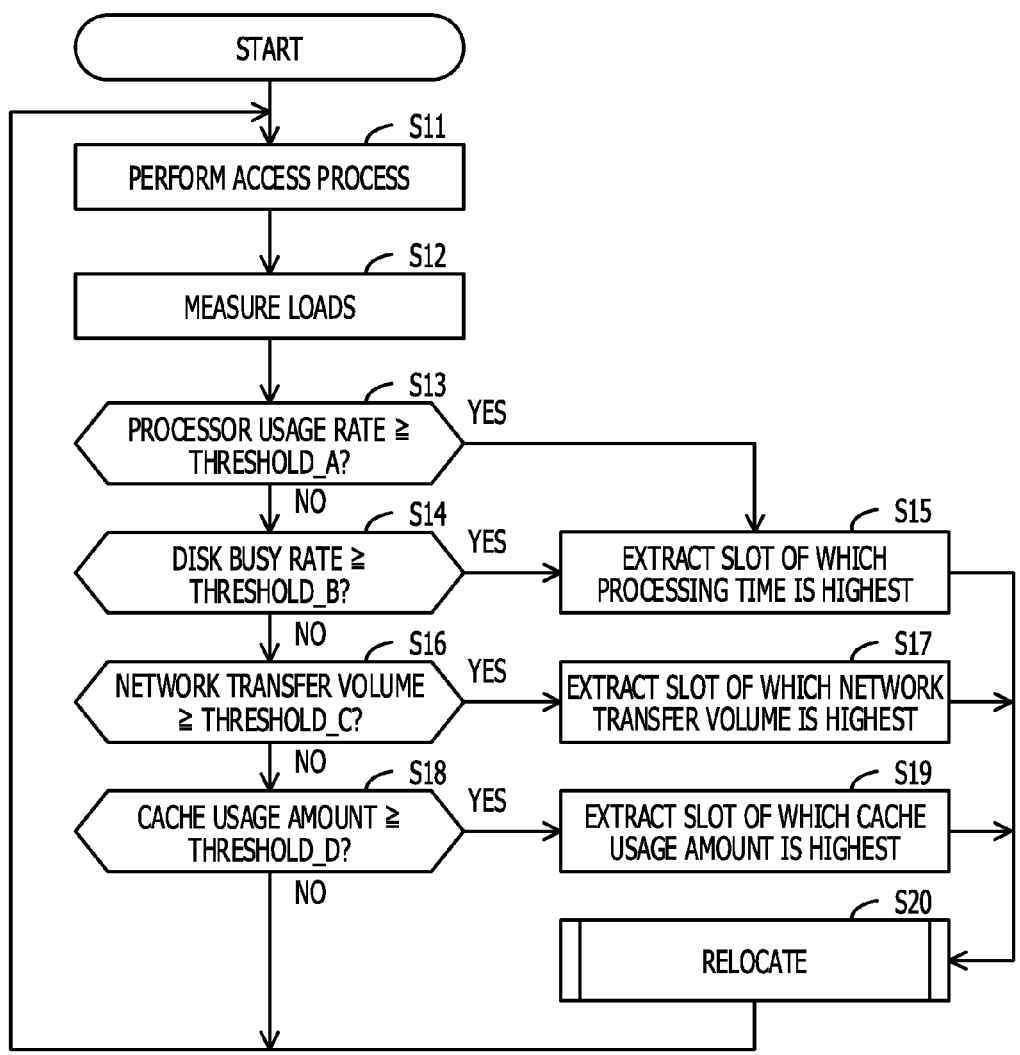
FIG. 10 is a flowchart of an exemplary determination process regarding whether or not a slot has to be relocated.

FIG. 10 is a flowchart of an exemplary determination process regarding whether or not a slot has to be relocated. Hereafter, the process illustrated in FIG. 10 is described in numbered order. Regarding the threshold values of the types of load values determined by the placement control unit 140, the threshold value corresponding to the processor usage rate is threshold_A. In a similar manner, the threshold value corresponding to the disk busy rate is threshold_B. The threshold value corresponding to the network transfer volume is threshold_C. The threshold value corresponding to the cache usage amount is threshold_D.

(S11) When an access request is received from the application server 200, the object I/O unit 120 accesses the object designated by the application server 200. At this time, the speed at which the object is accessed may be increased through use of the cache memory 110. The object I/O unit 120 then responds to the application server 200 with an access result. When reading is requested, the object I/O unit 120 transmits the read object to the application server 200.

(S12) The load measuring unit 130 measures the server load values of the storage server 100 which includes the load measuring unit 130 and the slot load values of the slot 11 which includes the object to which access has been requested at S11. The server load values include the processor usage rate, the disk busy rate, the network transfer volume, and the cache usage amount. The slot load values include the processing time of the slot 11, the network transfer volume of the slot 11, and the cache usage amount of the slot 11.

The load measuring unit 130 updates the server load information table 151 with the measured server load values. Specifically, the load measuring unit 130 updates the processor usage rate field of the server load information table 151 with the measured processor usage rate of the storage server 100. In a similar manner, the load measuring unit 130 updates the disk busy rate field of the server load information table 151 with the measured disk busy rate of the storage server 100. The load measuring unit 130 updates the network transfer volume field of the server load information table 151 with the measured network transfer volume of the storage server 100. The load measuring unit 130 updates the cache usage amount field of the server load information table 151 with the measured cache usage amount of the storage server 100.

In addition, the load measuring unit 130 updates the slot load information table 152 with the measured slot load values. Specifically, first, the load measuring unit 130 retrieves a record with which the identifier of the slot 11 which includes the object to which access has been requested at S11 matches. Next, the load measuring unit 130 updates the processing time field of the retrieved record with the measured processing time of the slot 11. In a similar manner, the load measuring unit 130 updates the network transfer volume field of the retrieved record with the measured network transfer volume of the slot 11. The load measuring unit 130 updates the cache usage amount field of the retrieved record with the measured cache usage amount of the slot 11.

(S13) The placement control unit 140 determines whether or not the processor usage rate in the server load information table 151 is threshold_A or higher. When determined that the processor usage rate is threshold_A or higher, the placement control unit 140 proceeds to S15. When determined that the processor usage rate is less than threshold_A, the placement control unit 140 proceeds to S14.

(S14) The placement control unit 140 determines whether or not the disk busy rate in the server load information table 151 is threshold_B or higher. When determined that the disk busy rate is threshold_B or higher, the placement control unit 140 proceeds to S15. When determined that the disk busy rate is less than threshold_B, the placement control unit 140 proceeds to S16.

(S15) The placement control unit 140 extracts a slot 11 of which the processing time is the highest from the slot load information table 152.

(S16) The placement control unit 140 determines whether or not the network transfer volume in the server load information table 151 is threshold_C or higher. When determined that the network transfer volume is threshold_C or higher, the placement control unit 140 proceeds to S17. When determined that the network transfer volume is less than threshold_C, the placement control unit 140 proceeds to S18.

(S17) The placement control unit 140 extracts a slot 11 of which the network transfer volume is the highest from the slot load information table 152.

(S18) The placement control unit 140 determines whether or not the cache usage amount in the server load information table 151 is threshold_D or higher. When determined that the cache usage amount is threshold_D or higher, the placement control unit 140 proceeds to S19. When determined that the cache usage amount is less than threshold_D, the placement control unit 140 proceeds to S11.

(S19) The placement control unit 140 extracts a slot 11 of which the cache usage amount is the highest from the slot load information table 152.

(S20) The placement control unit 140 relocates the extracted slot 11 to a disk 10 that is connected to another storage server 100. Details of the relocation are described with reference to FIG. 11. The placement control unit 140 then proceeds to S11.

Here, in the storage server 100, there is an issue in that the slot 11 that is capable of significantly reducing the load placed on the storage server 100 is difficult to accurately determine. A reason for this is that it is difficult to accurately determine which slot 11, among the slots 11 stored in the disk 10 corresponding to the storage server 100, is most affecting the load placed on the storage server 100.

For example, as a method for determining the slot 11 to be moved to another storage node, a method may be considered in which a slot 11 with the highest access frequency is selected. However, for example, even when the slot 11 with the highest access frequency is moved to another storage node when the processor usage rate or the disk busy rate of the storage server 100 reaches a predetermined threshold value or higher, the processor usage rate or the disk busy rate may not significantly decrease.

For example, the possibility is high that an object included in a slot 11 having a high access frequency is recorded in the cache memory 110. Therefore, the possibility also becomes high that the disk 10 is not accessed when such a slot 11 is accessed. Therefore, even when the slot 11 with the highest access frequency is moved to another storage node, the disk busy rate of the storage server 100 from which the slot 11 is moved may not significantly decrease.

In addition, even among objects with the same access frequency, if the objects differ in size, the effect on the processor usage rate of the storage server 100 also differs. Therefore, even when the slot 11 with the highest access frequency is moved to another storage node, the processor usage rate of the storage server 100 from which the slot 11 is moved may not significantly decrease depending on the size of the object that has been accessed numerous times in the slot 11.

A reason that an issue such as that described above occurs is that the correlation between a load parameter (slot load value) for each slot 11, in other words, the access frequency and the server load values used in combination with the parameter, in other words, the processor usage rate and the disk busy rate is low. In this regard, in the above-described process in FIG. 10, the above-described issue may be solved by associating and using a server load value and a slot load value that are highly correlated with each other.

As a method for associating a server load value and a slot load value that are highly correlated, for example, there is a method in which load values that are of the same type are associated. In the example in FIG. 10, the network transfer volume among the types of server load values and the network transfer volume among the types of slot load values are associated. In addition, the cache usage amount among the types of server load values and the cache usage amount among the types of slot load values are associated.

When the network transfer volume of the storage server 100 reaches threshold_C or higher, as a result of a slot 11 with the highest network transfer volume being moved to another storage node, the possibility becomes high that the network transfer volume of the storage server 100 is decreased as much as possible. In a similar manner, when the cache usage amount of the storage server 100 reaches threshold_D or higher, as a result of a slot 11 with the highest cache usage amount being moved to another storage node, the possibility becomes high that the cache usage amount of the storage server 100 is decreased as much as possible. Therefore, the data to be moved to reduce the load placed on the storage server 100 may be accurately selected.

Regarding the above-described access frequency as well, when the access frequency of the overall storage server 100 reaches a predetermined threshold or higher, as a result of a slot 11 with the highest access frequency being moved to another storage node, the possibility becomes high that the access frequency of the overall storage server 100 is significantly decreased.

On the other hand, regarding the processor usage rate and the disk busy rate among the types of server load values, the same types are not present among the slot load values. Many OSs do not include a function of measuring the processor usage rate and disk busy rate for each slot 11 to be accessed. Therefore, in order to measure the processor usage rate and disk busy rate for each slot 11, an additional function needs to be added to the storage server 100, increasing costs of development and manufacturing.

In this regard, in the process illustrated in FIG. 10, the processing time for each slot 11 is associated with the processor usage rate and the disk busy rate of which the same types are not present in the slot load values. Many OSs include a function of measuring the processing time of the slot 11. For example, when the OS is LINUX®, the processing time is able to be measured by a "time" command. In addition, the processing time may be easily measured by executing an application program.

As described above, the processing time is the period from the time at which the access request for an object included in the slot 11 is received to the time at which a response is made that the access process has been completed. A reason that such time is taken from the access request to the response includes numerous factors in combination. For example, factors may be considered, such as processing by the processor for data output and input to and from the disk 10 or cache control, the size of the object to be accessed, and a seek process in a case in which the disk 10 is an HDD.

Because the processing time is an added value of time consumed by many factors such as those described above, the processing time may have a certain correlation or higher with any type of server load value. Therefore, as a result of the processing time being associated as the slot load value with the processor usage rate and the disk busy rate of which the same types are not present in the slot load values, the possibility becomes higher that a slot 11 is selected that significantly reduces the processor usage rate and the disk busy rate. As a result, the data to be moved to reduce the load placed on the storage server 100 may be appropriately selected.

Figure 11:
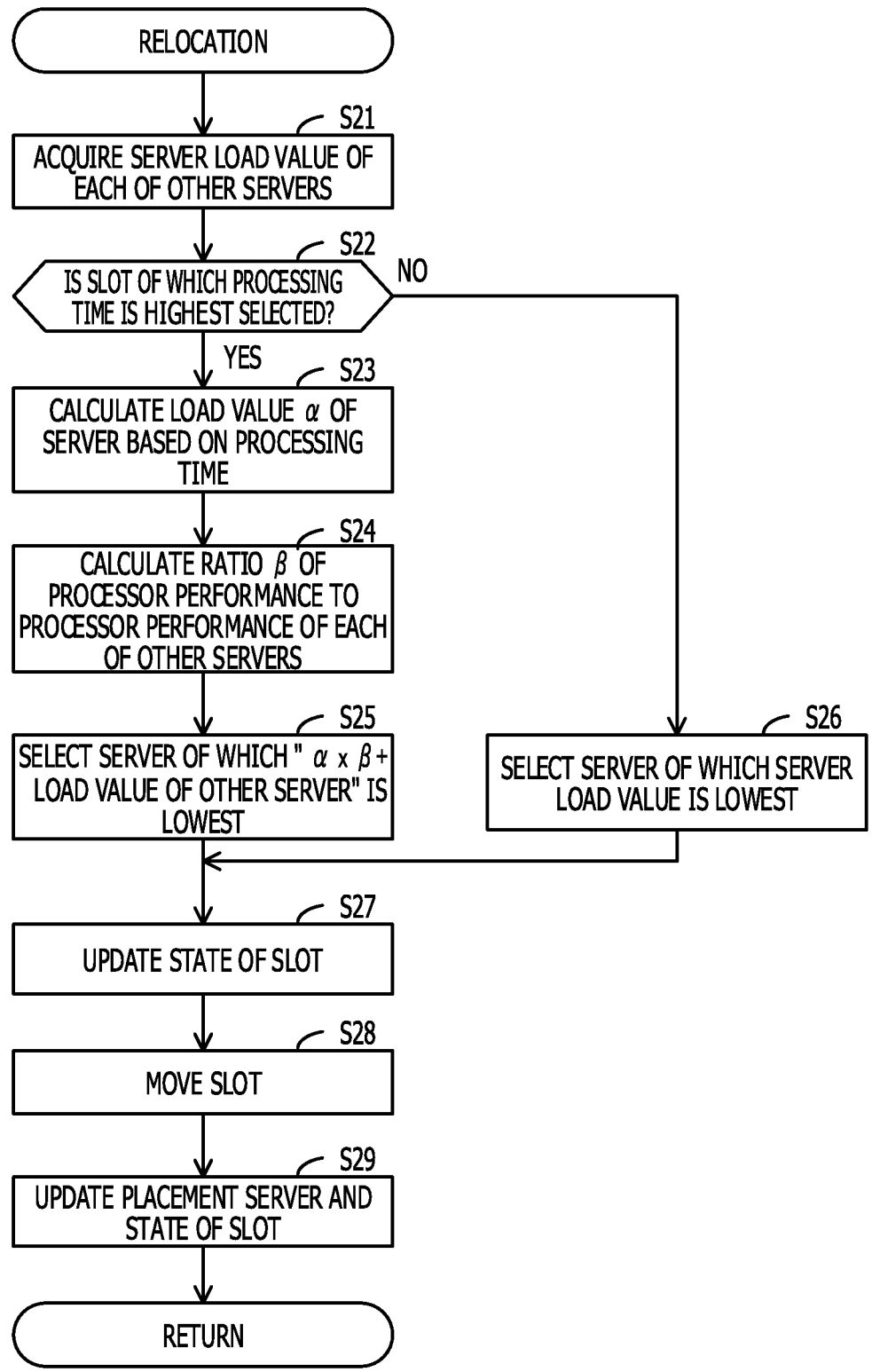
FIG. 11 is a flowchart of an exemplary process for relocating a slot.

FIG. 11 is a flowchart of an exemplary process for relocating a slot. Hereafter, the process illustrated in FIG. 11 is described in numbered order.

(S21) The placement control unit 140 acquires the measurement value of the server load value of the same type as the server load value that is the threshold value or higher from each of the other storage servers 100. For example, the placement control unit 140 acquires the measurement value of the processor usage rate from each of the other storage servers 100 when determined at S13 that the processor usage rate is threshold_A or higher.

(S22) The placement control unit 140 determines whether or not the slot 11 of which the processing time is the highest has been extracted by the process at S15. When determined that the slot 11 has been extracted by the process at S15, the placement control unit 140 proceeds to S23. When determined that the slot 11 is extracted by a process other than the process at S15, the placement control unit 140 proceeds to S26.

(S23) The placement control unit 140 calculates a load value α of the load placed on the storage server 100 during the access process on the extracted slot 11 based on the processing time of the extracted slot 11, in the following manner. The type of the load value α in this case is the type of the server load value that is the threshold or higher.

First, the placement control unit 140 calculates a proportion of the processing time of the slot 11 extracted at S15 to a total processing time of the slots 11 managed by the storage server 100. Next, the placement control unit 140 calculates, as the load value α, a value derived by the server load value determined at S13 or S14 to have reached the threshold or higher being multiplied by the calculated proportion of the processing time.

(S24) The placement control unit 140 calculates a ratio β of the processor performance of the storage server 100 which includes the placement control unit 140 to processor performance of each of other storage servers 100. The processor performance of each storage server 100 is acquired from the processor performance table 153.

(S25) The placement control unit 140 calculates a value derived by the server load value acquired at S21 being added to a product of the load value α multiplied by the ratio β, for each of the other storage servers 100, as an estimation value of the server load value after slot relocation. Then, the placement control unit 140 selects a storage server 100 of which the calculated server load value after relocation is the lowest and identifies the selected storage server 100 as the storage server 100 (referred to as a destination storage server 100) that is the movement destination.

As described at S23 to S25, the placement control unit 140 takes into consideration the processor performance of each storage servers 100 when selecting the destination storage server 100, and identifies the destination storage server 100 such that the server load value when the slot 11 is moved becomes the lowest. Details are described with reference to FIG. 12.

(S26) The placement control unit 140 selects a storage server 100, among the other storage servers 100, of which the server load value acquired at S21 is the lowest and identifies the storage server 100 as the destination storage server 100.

(S27) The placement control unit 140 updates the state of the slot 11 to be moved, in the slot placement table 211 in each of the application servers 200. Specifically, first, the placement control unit 140 retrieves, from the slot placement table 211, a record with which the identifier of the slot 11 to be moved matches. Next, the placement control unit 140 updates the state field of the retrieved record to "moving". As a result, access from the application servers 200 to objects included in a slot 11 that is being moved is suppressed.

(S28) The placement control unit 140 issues a request to the object I/O unit 120 to move the extracted slot 11 to the destination storage server 100. The object I/O unit 120 moves the extracted slot 11 to the disk 10 corresponding to the storage server 100 identified at S25 or S26, via the storage server 100.

(S29) The placement control unit 140 updates information regarding the storage server 100 to which the slot 11 is moved and the state of the slot 11 to be moved, in the slot placement table 211 in each of the application servers 200. Specifically, first, the placement control unit 140 retrieves, from the slot placement table 211, a record with which the identifier of the slot 11 to be moved matches. Next, the placement control unit 140 updates the placement server field in the retrieved record with the identifier of the destination storage server 100. Then, the placement control unit 140 updates the state field in the retrieved record to "normal".

Figure 12:
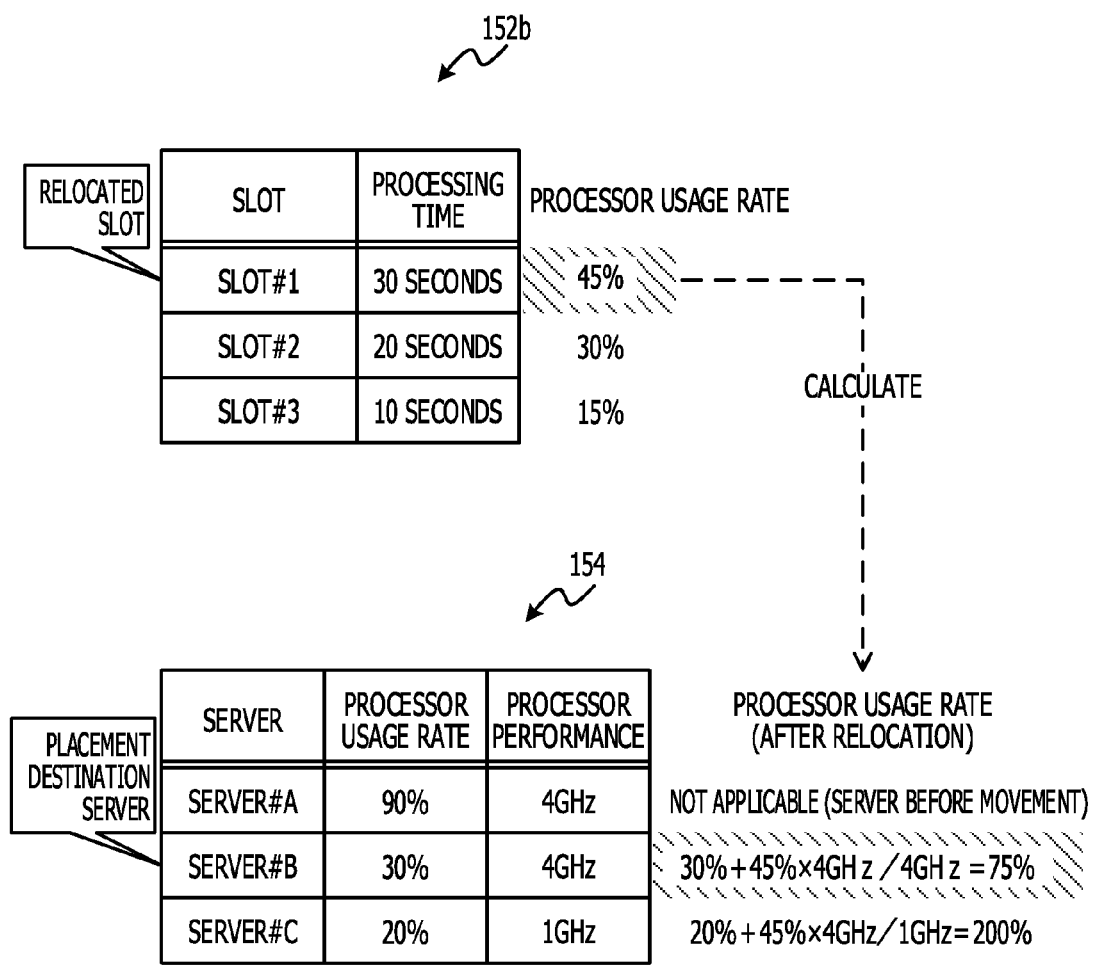
FIG. 12 is a diagram illustrating an example in which a destination storage server is identified.

FIG. 12 is a diagram illustrating an example in which a destination storage server is identified. An example of a process for identifying the destination storage server 100 of the slot 11 is described with reference to FIG. 12. In the example in FIG. 12, the slot 11 of storage server server#A is moved. In addition, in FIG. 12, server#B and server#C are present as other storage servers 100. Furthermore, in FIG. 12, the slots 11 managed by server#A include slot#1, slot#2, and slot#3.

Table 154 indicates the processor usage rates and the processor performances of server#A, server#B, and server#C. In addition, a slot load information table 152b indicates information related to slot#1, slot#2, and slot#3 that are managed by server#A. In the slot load information table 152b, the network transfer volume field and the cache usage amount field are omitted. In addition, it is assumed that threshold_A is "80%".

Here, for example, the processor usage rate of server#A reaches "90%", which is higher than threshold_A. In this case, first, the placement control unit 140 of server#A selects "processing time" that is a type corresponding to the processor usage rate, as the slot load value to be used to determine the slot 11 to be moved.

Next, the placement control unit 140 selects, from the slot load information table 152b, a slot 11 of which the processing time is the highest as the slot 11 to be relocated. As indicated in the slot load information table 152b, the processing times of the slots 11 managed by server#A are "30 seconds", "20 seconds", and "10 seconds", in the order of slot#1, slot#2, and slot#3. Therefore, slot#1 is selected as the slot 11 to be relocated.

Next, the placement control unit 140 estimates the processor usage rate of server#A during the access process on slot#1, based on the value of the processing time. Specifically, using the process indicated in S23 of FIG. 11, the placement control unit 140 calculates the processor usage rate during the access process on slot#1. As a result, the processor usage rate during the access process on slot#1 is "90 [%]×(30 [seconds]/(30 [seconds]+20 [seconds]+10 [seconds]))=45 [%]".

The placement control unit 140 then calculates the ratio of the processor performance of server#A to the processor performances of server#B and server#C. As indicated in table 154, the processor performances of the storage servers 100 are "4 GHz", "4 GHz", and "1 GHz", in the order of server#A, server#B, and server#C. Therefore, the processor performance ratio of server#A to server#B is "4 [GHz]/4 [GHz]=1". The processor performance ratio of server#A to server#C is "4 [GHz]/1 [GHz]=4".

Then, the placement control unit 140 calculates estimated values of the processor usage rates of server#B and server#C after relocation as described in S25 of FIG. 11, based on the calculated processor usage rate, the calculated processor performance ratio, and the measurement values of the processor usage rates of server#B and server#C, which are movement destination candidates. As indicated in table 154, the measurement value of the processor usage rate of server#B is "30%". The measurement value of the processor usage rate of server#C is "20%". Therefore, the processor usage rate of server#B after relocation is "30 [%]+45 [%]×1=75 [%]". The processor usage rate of server#C after relocation is "20 [%]+45 [%]×4=200 [%]". Therefore, server#B is identified as the destination storage server 100.

As illustrated in FIG. 12, when identifying the destination storage server 100, the placement control unit 140 takes into consideration the processor performance of the destination storage server 100 and selects the destination storage server 100 such that the server load values of the destination storage server 100 after movement of the slot 11 is the lowest. As a result, the object storage system 7 may equalize the server load values after relocation of the slot 11.

In the object storage system 7 according to the second embodiment described above, when any of the server load values stored in the server load information table reaches the threshold value or higher, the placement control unit 140 selects a slot 11 of which the slot load value of the type corresponding to the server load value that has reached the threshold or higher is the highest and relocates the selected slot 11 in another storage server 100.

In this process, the slot 11 to be moved is selected based on the slot load value, among the slot load values, of the type having a high correlation with the server load value that has reached the threshold or higher. Therefore, the possibility that the server load value that has reached the threshold or higher is significantly decreased becomes high. The slot 11 to be moved may be appropriately selected. In addition, the number of times the slots 11 are moved until the load distribution among the storage servers 100 is optimized is reduced. Therefore, the number of slots 11 that are not able to be accessed from the application servers 200 due to movement may be reduced. The amount of time during which access is not able to be performed may also be shortened.

As described above, information processing according to the first embodiment may be actualized by executing a program by the storage control devices 1 and 1a. Information processing according to the second embodiment may be actualized by executing programs by the storage server 100 and the application server 200. Such programs may be recorded in a computer-readable recording medium (such as the recording medium 43). For example, a magnetic disk, an optical disk, a magneto-optical disk, a semiconductor memory, or the like may be used as the recording medium.

The magnetic disk includes FD and HDD. The optical disk includes CD, CD-recordable (-R)/rewritable (RW), DVD, and DVD-R/RW.

If the program is to be circulated, for example, a portable recording medium on which the program is recorded is provided. In addition, the program may be stored in a storage device of another computer and distributed over a network. For example, a computer stores the program recorded on the portable recording medium or the program received from another computer in a storage device (such as the HDD 103), reads the program from the storage device, and executes the program. However, the program loaded from the portable recording medium may be directly executed. The program received from another computer over a network may be directly executed. In addition, at least a part of the above-described information processing may be actualized by an electronic circuit, such as a digital signal processor (DSP), an ASIC, or a programmable logic device (PLD).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage control device that controls access to a first storage device of a plurality of storage devices, the storage control device comprising:
    a first processor configured to:
        acquire measurement values of plural types of processing index values each indicating a state of processing loads on the storage control device, and plural types of access index values each indicating a state of loads of an access process performed for each of plural pieces of data stored in the first storage device, the plural types of access index values including a processing time during access to each of the plural pieces of data, the processing time corresponding to an amount of time from reception of an access request to a response of access completion;
        specify a first access index value corresponding to the processing time when the acquired measurement value of the first processing index value exceeds a threshold value set for the first processing index value, the first processing index value being one of the plural types of processing index values, the processing time being one of the plural types of access index values; and
        move a first piece of data from the first storage device to a second storage device of the plurality of storage devices, access to the second storage device being controlled by a first control device different from the storage control device, the acquired measurement value of the processing time for the first piece of data, among the plural pieces of data, being higher than the acquired measurement value of the processing time for the plural pieces of data other than the first piece of data.

2. The storage control device according to claim 1, wherein
    the first control device is one of a plurality of control devices each controlling access to a storage device of the plurality of storage devices, and
    a measurement value of the first processing index value for the first control device is lower than a measurement value of the first processing index value for any other control device of the plurality of control devices.

3. The storage control device according to claim 1, wherein
    the first access index value is of a same type of the first processing index value.

4. The storage control device according to claim 1, wherein
    one of the plural types of access index values is a network transfer volume or a cache usage amount, the network transfer volume indicating a total size of data transmitted or received by the storage control device during access to each of the plural pieces of data within a most recent unit time, the cache usage amount indicating a usage amount of cache memory included in the storage control device used for accessing each of the plurality of pieces of data.

5. The storage control device according to claim 1, wherein
    the first processing index value corresponding to the processing time is a processor usage rate or a disk busy rate, the processor usage rate indicating a percentage of time during which the first processor is performing processes within a most recent unit time, the disk busy rate indicating a percentage of time during which the storage control device is performing access processes on the first storage device within the most recent unit time.

6. The storage control device according to claim 1, wherein
    the first access index value is an access index value of a same type as the first processing index value when the access index value of the same type is present among the plural types of access index values, and
    the first access index value is the processing time when the access index value of the same type is not present among the plural types of access index values.

7. The storage control device according to claim 1, wherein
    the first control device is one of a plurality of control devices each controlling access to a storage device of the plurality of storage devices, and
    the first processor is further configured to
        calculate an estimation value of the processing time for each of the plurality of control devices based on a first measurement value and performance ratios, the estimation value involving an estimated processing time during access to the first piece of data, the first measurement value being the acquired measurement value of the processing time during access to the first piece of data, the performance ratios being ratios of performance of the first processor to performance of respective second processors included in the plurality of control devices, and
    the calculated estimation value for the first control device is lower than the calculated estimation value for any other control device of the plurality of control devices.

8. A storage control method performed by a storage control device that controls access to a first storage device of a plurality of storage devices, the storage control method comprising:

acquiring, by the storage control device, measurement values of
plural types of processing index values each indicating a state of processing loads on the storage control device, and
plural types of access index values each indicating a state of loads of an access process performed for each of a plural pieces of data stored in the first storage device, the plural types of access index values including a processing time during access to each of the plural pieces of data, the processing time corresponding to an amount of time from reception of an access request to a response of access completion;
specifying a first access index value corresponding to the processing time when the acquired measurement value of the first processing index value exceeds a threshold value set for the first processing index value, the first processing index value being one of the plural types of processing index values, the processing time being one of the plural types of access index values; and
moving a first piece of data from the first storage device to a second storage device of the plurality of storage devices, access to the second storage device being controlled by a first control device different from the storage control device, the acquired measurement value of the processing time for the first piece of data, among the plural pieces of data, being higher than the acquired measurement value of the processing time for the plural pieces of data other than the first piece of data.

9. The storage control method according to claim 8, wherein
the first control device is one of a plurality of control devices each controlling access to a storage device of the plurality of storage devices, and
a measurement value of the first processing index value for the first control device is lower than a measurement value of the first processing index value for any other control device of the plurality of control devices.

10. The storage control method according to claim 8, wherein
the first access index value is of a same type of the first processing index value.

11. The storage control method according to claim 8, wherein
the first access index value is an access index value of a same type as the first processing index value when the access index value of the same type is present among the plural types of access index values, and
the first access index value is the processing time when the access index value of the same type is not present among the plural types of access index values.

12. The storage control method according to claim 8, wherein
the first control device is one of a plurality of control devices each controlling access to a storage device of the plurality of storage devices,
the storage control method further comprises:
calculating an estimation value of the processing time for each of the plurality of control devices based on a first measurement value and performance ratios, the estimation value involving an estimated processing time during access to the first piece of data, the first measurement value being the acquired measurement value of the processing time during access to the first piece of data, the performance ratios being ratios of performance of the first processor to performance of respective second processors included in the plurality of control devices, and
the calculated estimation value for the first control device is lower than the calculated estimation value for any other control device of the plurality of control devices.

13. A computer-readable recording medium having stored therein a storage control program for causing a computer that controls access to a first storage device of a plurality of storage devices to execute a process, the process comprising:
acquiring measurement values of plural types of processing index values each indicating a state of processing loads on the computer, and plural types of access index values each indicating a state of loads of an access process performed for each of a plural pieces of data stored in the first storage device the plural types of access index values including a processing time during access to each of the plural pieces of data, the processing time corresponding to an amount of time from reception of an access request to a response of access completion;
specifying a first access index value corresponding to a to the processing time when the acquired measurement value of the first processing index value exceeds a threshold value set for the first processing index value, the first processing index value being one of the plural types of processing index values, the processing time being one of the plural types of access index values; and
moving a first piece of data from the first storage device to a second storage device of the plurality of storage devices, access to the second storage device being controlled by a first control device different from the computer, the acquired measurement value of the processing time for the first piece of data, among the plural pieces of data, being higher than the acquired measurement value of the processing time for the plural pieces of data other than the first piece of data.

* * * * *